United States Patent [19]

Hansen

[11] 4,192,348
[45] Mar. 11, 1980

[54] FLUID CONTROL UNIT
[75] Inventor: Craig N. Hansen, St. Paul, Minn.
[73] Assignee: Hansen Engine Corporation, Minneapolis, Minn.
[21] Appl. No.: 894,752
[22] Filed: Apr. 10, 1978
[51] Int. Cl.² ............................................. F16K 31/04
[52] U.S. Cl. ............................ 137/624.15; 137/624.2
[58] Field of Search .................... 137/624.15, 624.13, 137/624.2, 624.18, 625.23

[56] References Cited
U.S. PATENT DOCUMENTS

| 1,967,851 | 7/1934 | Wilson | 137/624.15 X |
| 2,308,705 | 1/1943 | Meredith | 137/624.15 X |
| 2,980,138 | 4/1961 | Detweiler | 137/625.23 X |
| 3,650,295 | 3/1972 | Smith | 137/624.15 X |

Primary Examiner—Alan Cohan
Attorney, Agent, or Firm—Burd, Bartz & Gutenkauf

[57] ABSTRACT

A control unit receiving fluid under pressure discharges the fluid in a pulsed manner to a receiver. The control unit has a rotatable sleeve accommodating an axially movable piston. The sleeve and piston have cooperating openings and grooves that control the pulsed flow of fluid from the control unit. The operating position of the piston responds to the pressure of the fluid on the piston and the relative angular orientation of the piston to the fluid discharge openings in the sleeve.

43 Claims, 9 Drawing Figures

FLUID CONTROL UNIT

SUMMARY OF INVENTION

The present invention is directed to a control unit for controlling the intermittent discharge of a fluid to a receiver for accommodating or utilizing the fluid. The fluid can be a gas or liquid. The gas can include air, a hydrocarbon fuel and air mixture, propane, hydrogen, and the like. The liquid can include water, oil, and other liquids. The control unit has a rotatable tubular sleeve accommodating a piston. The sleeve has outlet openings for carrying fluid out of the control unit. The piston is slidably mounted in the sleeve and has grooves providing passages for carrying the fluid to the sleeve outlet openings. The outlet openings of the sleeve are aligned with the grooves in the piston so that on rotation of the sleeve the fluid within the sleeve is intermittently discharged to the receiver. A drive means functions to rotate the sleeve. A piston control mechanism operates to circumferentially orient the piston in the sleeve. The circumferential position of the piston controls the timing, as well as the amount of fuel that is allowed to flow through the outlet openings in the sleeve to the receiver.

DESCRIPTION OF PREFERRED EMBODIMENTS

Figure 1:
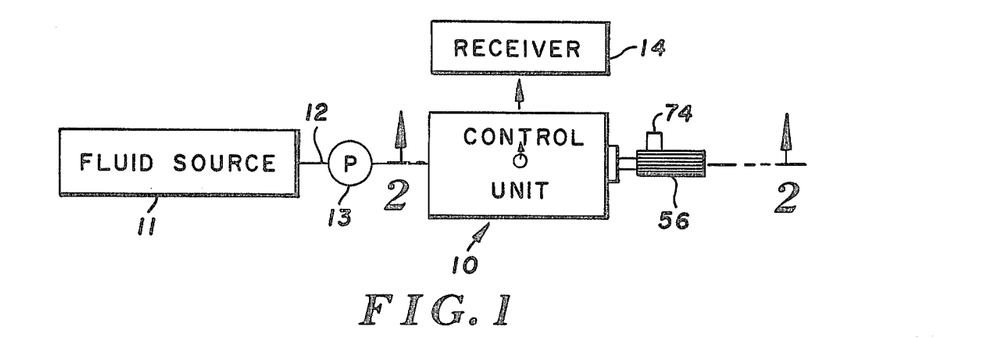
FIG. 1 is a diagrammatic view of the control unit of the invention associated with a fluid source and a receiver.

Referring to FIG. 1, there is shown a control unit of the invention indicated generally at 10 in association with a fluid source 11 and a receiver 14. A pump 13 moves the fluid from the source 11 into control unit 10. The fluid in source 11 can be under pressure so that pump 13 can be replaced with a valve to regulate the flow of the fluid to control unit 10. Control unit 10 operates to deliver controlled increments or pulses of fluid to receiver 14. The fluid can be air or a gaseous fuel, such as propane, hydrogen, or a hydrocarbon fuel and air mixture including but not limited to gasoline and air. The fluid is any substance which cannot sustain a shear stress. Receiver 14 can be a burner, combustion chamber or an internal combustion engine. Receiver 14 is a utilizer of the fluid discharged by the control unit. The fluid can be a liquid, as water, oil, fuel oil, and the like.

Figure 2:
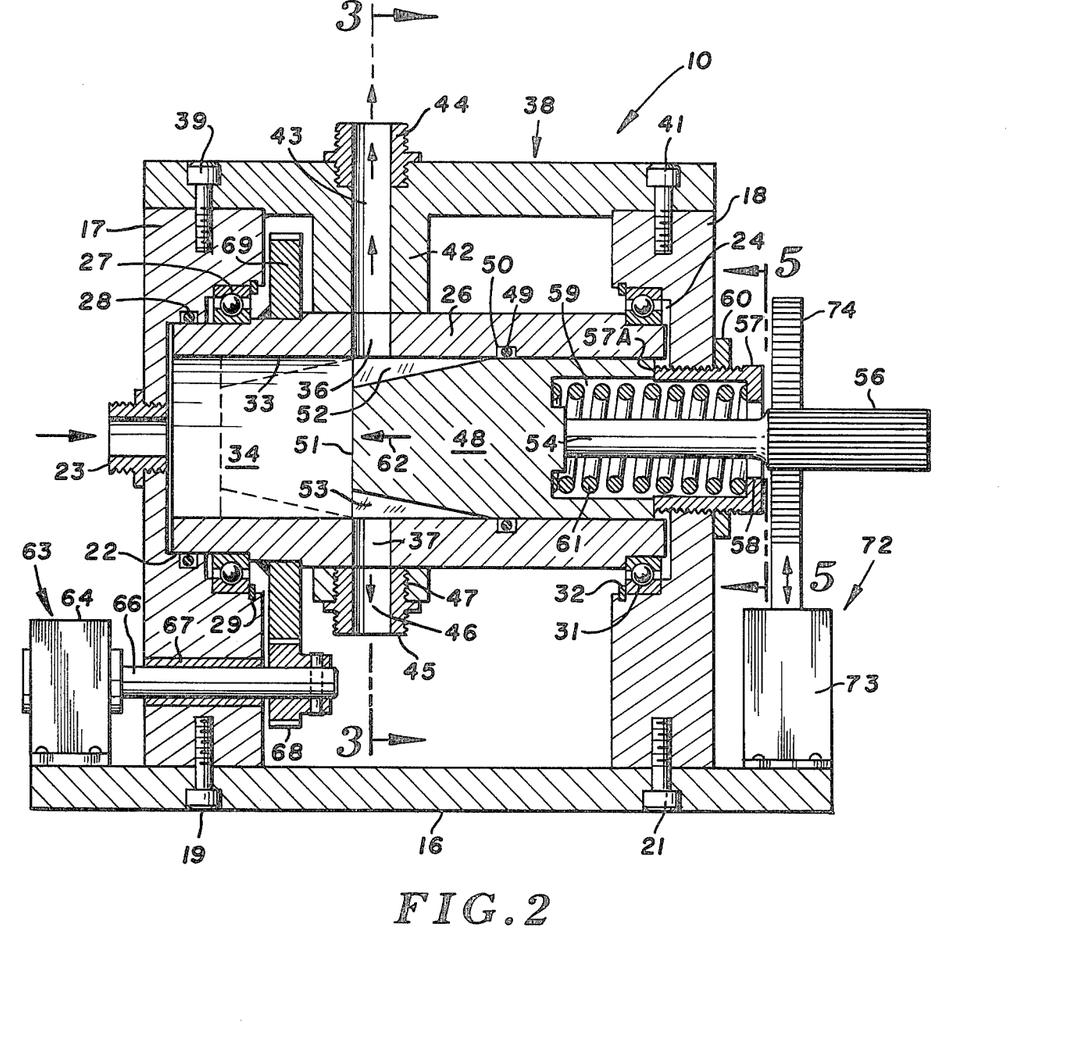
FIG. 2 is an enlarged sectional view taken along the line 2—2 of the control unit of FIG. 1.

Referring to FIG. 2, control unit 10 has a support comprising a base 16 and end plates 17 and 18. End plates 17 and 18 are attached to base 16 with bolts 19 and 21, respectively. End plate 17 has a bore 22 and a central inlet nipple 23. Pump 13 is connected to nipple 23 to deliver the fluid under pressure to control unit 10.

End plate 18 has a bore 24 facing the bore 22 in end plate 17. A horizontal tubular member, drum or sleeve 26 extends between end plates 17 and 18. Sleeve 26 has a first or left end located in bore 22. A first bearing 27 rotatably mounts the sleeve 26 on end plate 17. An annular seal 28 is interposed between bearing 27 and the end of sleeve 26. Seal 28 is an annular compression seal that prevents the fluid from escaping around sleeve 26 past bearing 27. A snap ring 29 fits into an annular groove in end plate 17 and engages the bearing 27 to hold the bearing 27 in assembled relation with end plate 17.

A second bearing 31 mounted on end plate 18 rotatably supports the opposite or right end of sleeve 26. A snap ring 32 interposed in a groove in end plate 18 engages bearing 31 to hold bearing 31 in assembled relation with end plate 18.

Sleeve 26 has a cylindrical inside wall 33 surrounding a chamber 34. The end of chamber 34 is open to the inlet nipple 23 whereby pump 13 delivers the fluid under pressure to chamber 34.

Sleeve 26 has a pair of outlet openings or holes 36 and 37. As shown in FIG. 2, holes 36 and 37 are diametrically opposite from each other and are open to a manifold indicated generally at 38. Sleeve 26 can have additional fluid discharge holes to increase the frequency of the pulses of fluid that is discharged from control unit 26. Alternatively, sleeve 26 can have a single discharge hole. Manifold 38 can have an annular chamber for receiving fluid from holes 36 and 37. Bolts 39 and 41 mount the manifold 38 on the end plates 17 and 18. Manifold 38 has a body 42 surrounding sleeve 26. A first passage 43 in body 42 leads from the outer surface of sleeve 26 to a first outlet nipple 44. The second outlet nipple 46 is threaded into the bottom of body 42. Outlet nipples 44 and 46 are connected with suitable lines or tubes to carry the pulsed or charges of fluid to receiver 14.

Figure 4:
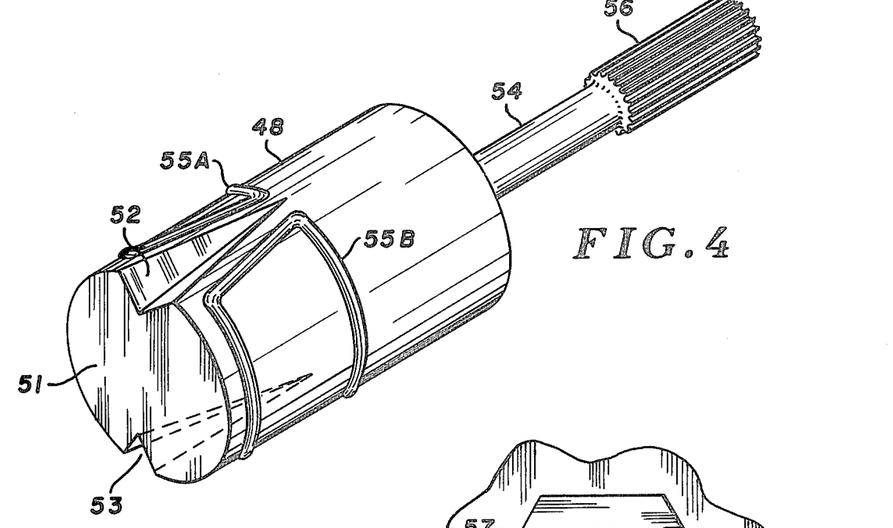
FIG. 4 is a perspective view of the control piston of the control unit.
Figure 5:
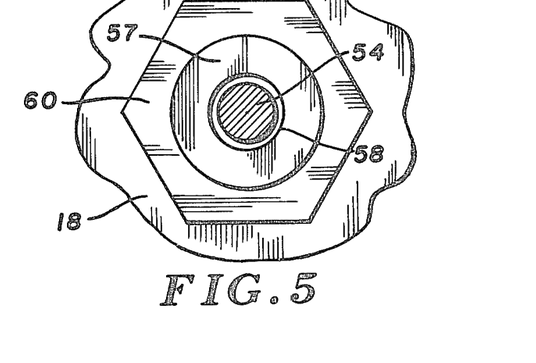
FIG. 5 is a sectional view taken along line 5—5 of FIG. 2.

A cylindrical control piston 48 is slidably located in chamber 34. An annular seal 49 surrounds the mid-portion of piston 48. Seal 49 is a compression seal that allows linear movement of piston 48. Seal 49 is interposed in an annular groove 50 in the inside wall 33 of sleeve 26. Piston 48 has a head 51 facing inlet nipple 23. The outer portion of the head 51 has a pair of V-shaped grooves 52 and 53. As shown in FIG. 4, the groove 52 has a generally V-shape which diminishes in depth toward the center of piston 48. The groove 53 has the same V-shaped configuration as groove 52. Grooves 52 and 53 have a uniform decrease in depth from head 51 toward the center or mid-section of the piston 48. Grooves 52 and 53 can have other lengths and cross sectional shapes including but not limited to rectangular, square, U-shaped, semi-circular, and semi-elliptical. Also, the grooves 52 and 53 can have a non-linear or stepped configuration and can be extended in a non-axial direction, as helical, spiral, and the like.

As shown in FIGS. 2 and 4, a cylindrical stem 54 extends rearwardly from control piston 48 along the longitudinal axis of piston 48. The outer end of stem 54 is enlarged and has a plurality of linear teeth forming a spur gear 56. Box or generally rectangular seals 55A and 55B mounted on the outer surface of piston 48 engage wall 33 to prevent flow of fluid from grooves 52 and 53 when the grooves are not aligned with holes 36 and 37.

As shown in FIG. 2, stem 54 extends axially through a hole 58 in a hub 57 mounted on end plate 18. Hub 57 is a cup-shaped member that is threaded into a hole in end plate 18. Hub 57 has an annular end 57A that serves as a stop for limiting the full open position of piston 48. The end wall of hub 57 has a hole 58 having a diameter slightly larger than the diameter of the spur gear 56 so that the spur gear can move into the hub 57. A nut 60 threaded on hub 57 engages end plate 18 to fix the position of hub 57 on plate 18.

Control piston 48 has a recess 59 surrounding stem 54. A compression spring 61 located in recess 59 bears against the back of piston 48 and base of hub 57. Spring 61 biases the piston in a forward direction, as indicated by the arrow 62. When piston 48 is in its full forward direction, as shown in broken lines, outlet openings 36 and 37 are closed.

A drive unit indicated generally at 63 operates to rotate sleeve 26. Drive unit 63 comprises an electric motor 64 having a horizontal drive shaft 66. Shaft 66 extends through a sleeve bearing 67 and end plate 17. The remote end of shaft 66 carries a small spur gear 68. Gear 68 is located in driving relationship with a large spur gear 69 mounted to the sleeve 26. Gear 69 surrounds the sleeve 26 so that on rotation of the gear 68 the sleeve 26 will rotate about a generally horizontal axis. Other types of drives can be used to rotate sleeve 26.

The angular or arcuate position of piston 48 is controlled with a piston control mechanism 72. Piston control mechanism 72 circumferentially orients piston 48 in an arcuate direction as shown by the arrow 76 in FIG. 3. Piston control mechanism 72 comprises a motor 73, such as a solenoid, hydraulic or air cylinder operatively connected to a linear rack 74. Rack 74 has a plurality of linear teeth that are in meshing engagement with the teeth of spur gear 56. Motor 73 operates to selectively move rack 74 up and down to rotate piston 48 about its horizontal or longitudinal axis. Rack 74 also prevents piston 48 from rotating with sleeve 26.

In use, pump 13 operates to move fluid from fluid source 11 to chamber 34 of control unit 10. The pressure of the fluid in chamber 34 moves control piston 48 in a rearward direction or to the right, as shown in FIG. 2. This locates grooves 52 and 53 in the plane of exit openings 36 and 37. Gear 56 being in engagement with rack 74 prevents piston 48 from rotating with sleeve 26. Gear 56 sliding on rack 74 allows piston 48 to linearly move in chamber 34. When the pressure of the fluid in chamber 34 is reduced, spring 61 will bias piston 48 in a forward direction indicated by arrow 62. As piston 48 moves in a forward direction it progressively restricts the amount of fluid that can flow from chamber 34 into passages 36 and 37. The pressure of fluid in chamber 34 controls the dwell or open time of the alignment of grooves 52 and 53 with openings 36 and 37. Piston 48 can also be actuated in a linear direction by means other than fluid pressure. Mechanical means, as a screw or lever, can be used to linearly move piston 48 in chamber 34.

Drive unit 63 is operable to rotate sleeve 26. Motor 64 rotates shaft 66 which in turn drives gear 68. This rotates gear 69 and sleeve 26. The speed of rotation of the sleeve 26 can be varied by varying the speed of motor 64. Openings 36 and 37 are sequentially aligned with the exit passages 43 and 46 so that increments of fluid are allowed to flow into passages 43 and 46 each time the grooves 52 and 53 are aligned with the discharge openings 36 and 37. The amount of fluid that is discharged into passages 43 and 46 is dependent upon the pressure of the fluid in the chamber 34, since the pressure of the fluid in chamber 34 determines the linear position of control piston 48 and the size of the portions of the grooves that align with the discharge openings 36 and 37 in sleeve 26.

Piston control mechanism 72 operates to control the circumferential orientation of piston 48. Piston 48 can be circumferentially oriented, as shown by arrow 76 in FIG. 3, to change the alignment of the grooves 52 and 53 relative to the outlet passages 43 and 46. This provides an additional control for the size of the grooves 52 and 53, thereby controlling the amount of fluid that can flow through openings 36 and 37 into the passages 43 and 46 independent of the pressure of the fluid in chamber 34.

Figure 3:
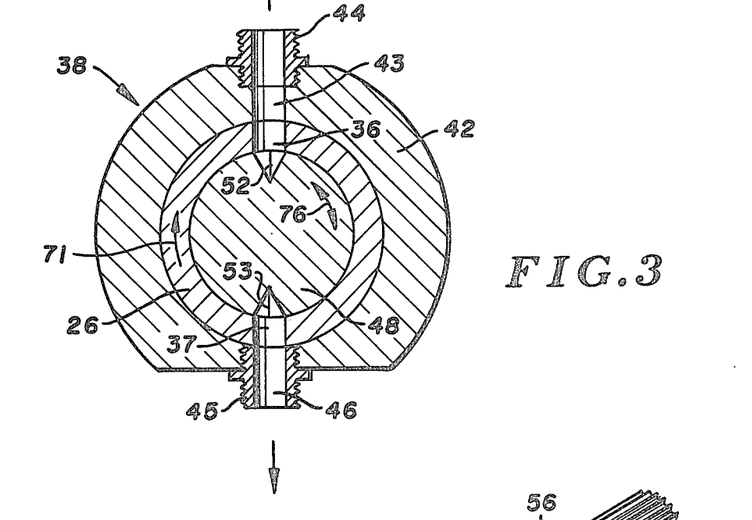
FIG. 3 is a sectional view taken along the line 3—3 of FIG. 2.

Piston 48 operates to allow a controlled pulsed flow of fluid to receiver 14. The amount of fluid in each pulse is determined by the pressure of the fluid in the chamber 34 and the circumferential orientation of the piston 48. Motor 73 operates to selectively move the rack 74 up or down and thereby rotate piston 48. This changes the circumferential orientation of grooves 52 and 53 relative to manifold passages 43 and 46 thereby restricting the discharge of fluid through openings 36 and 37.

Figure 6:
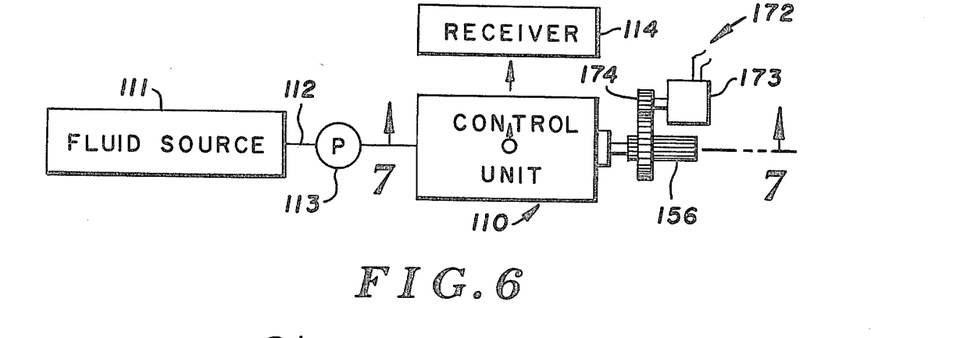
FIG. 6 is a diagrammatic view of a control unit of a modification of the invention associated with a fluid source and a receiver.

Referring to FIG. 6, there is shown a modification of the control unit of the invention indicated generally at 110 in association with a fluid source 111 and a fluid receiver 114. A pump 113 moves fluid from source 111 into control unit 110. The fluid in source 111 can be under pressure so that pump 113 can be replaced with a valve or other suitable structure to regulate the flow of fluid to control unit 110. Control unit 110 operates to deliver pulsated increments of fluid to receiver 114. The fluid can be any substance which cannot sustain a shear stress. The fluid includes air, gas, gaseous fuels, such as propane, hydrogen, or hydrocarbon fuel and air mixture, and liquids, including but not limited to water, oil, fuel oil, and the like.

Figure 7:
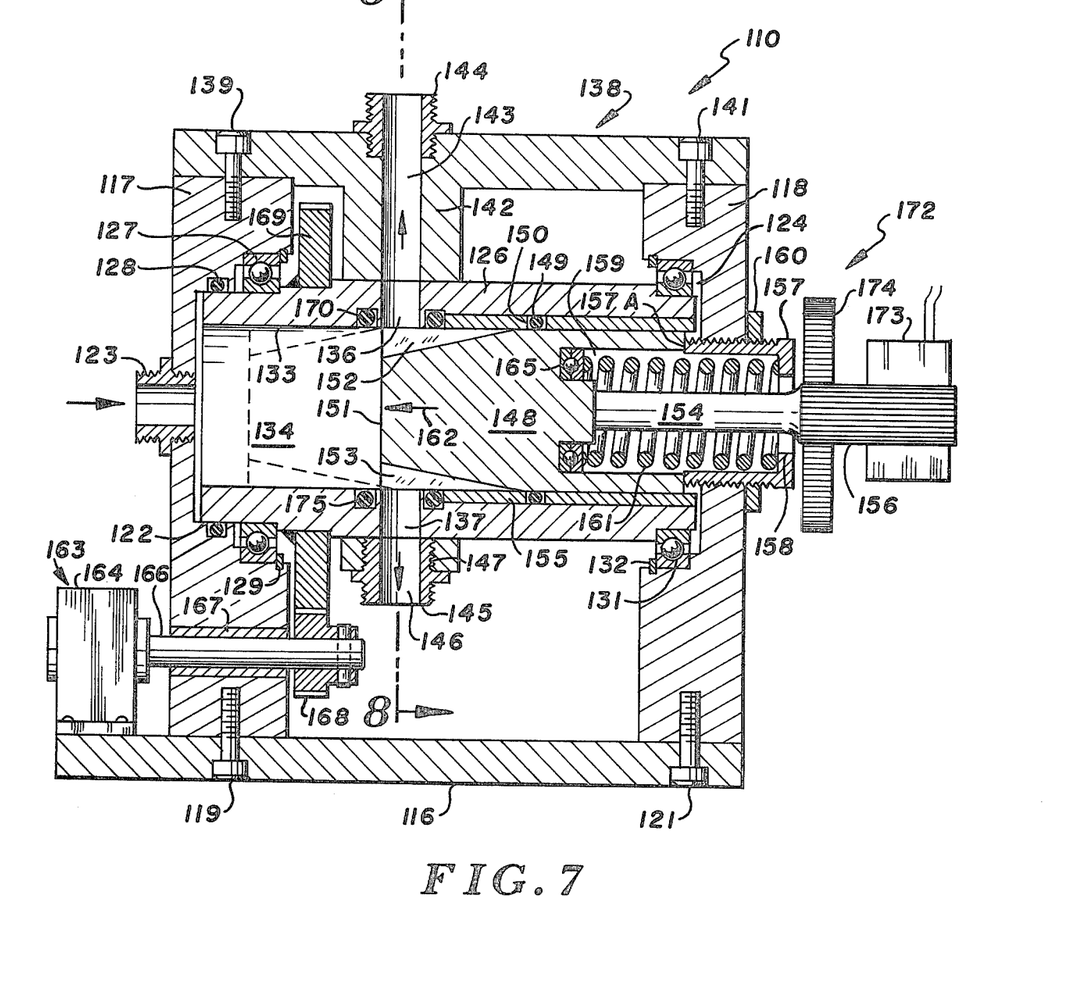
FIG. 7 is an enlarged sectional view taken along the line 7—7 of FIG. 6.

Referring to FIG. 7, control unit 110 has a base 116 carrying a pair of upright end plates 117 and 118. Bolts 119 and 121 secure plates 117 and 118 to base 116. End plate 117 has a axial horizontal bore 122 having an outlet opening carrying a central inlet nipple or tubular adapter 123. Nipple 123 receives the hose or line connected to pump 113 for carrying the fluid under pressure to control unit 110.

End plate 118 has an axial horizontal bore 124. A tubular member 126, shown as a drum or sleeve, extends between end plates 117 and 118. Sleeve 126 has a first or left end located in bore 122. An annular first bearing 127 rotatably mounts sleeve 126 on end plate 117. An annular seal 128 interposed between bearing 127 and the end of sleeve 126 prevents the flow of fluid around the end of sleeve 126 into bearing 127. A snap ring 129 holds bearing 127 on end plate 117.

A second bearing 131 rotatably mounts the right end of sleeve 126 on end of plate 118. A snap ring 132 interposed in a groove in end plate 118 holds bearing 131 on end plate 118.

Figure 8:
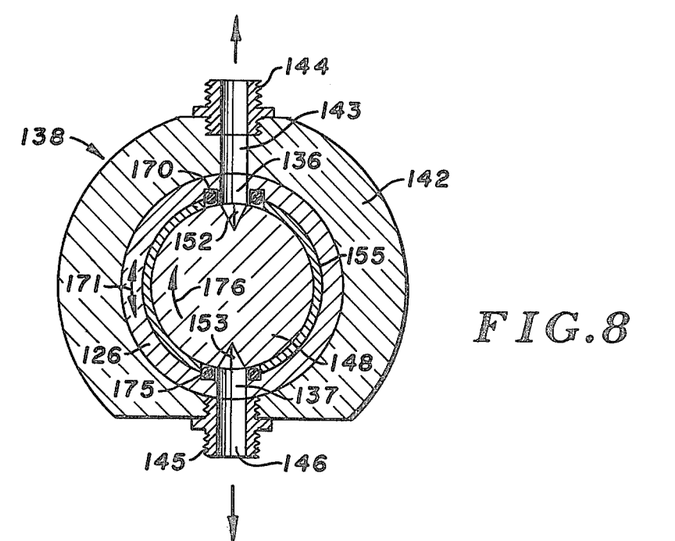
FIG. 8 is a sectional view taken along the line 8—8 of FIG. 7.

Sleeve 126 has a cylindrical inside wall 133 surrounding a fluid receiving chamber 134. Nipple 123 has a passage open to chamber 134 so that the fluid from pump 113 is delivered under pressure to chamber 134. Sleeve 126 has a pair of outlet or discharge openings or holes 136 and 137. As shown in FIGS. 7 and 8, holes 136 and 137 are diammetrically opposite from each other. Each hole 136 and 137 is open to a manifold indicated generally at 138. Sleeve 126 can have additional fluid discharge holes to increase the frequency of the pulses of fluid that are discharged from control unit 110. Alternatively, sleeve 126 can have a single discharge hole. Manifold 138 can have an annular chamber with a single outlet so that the combined discharges of the fuel will be discharged sequentially from manifold 138. Manifold 138 is attached to end plates 117 and 118 with bolts 139 and 141. Manifold 138 has an annular body 142 surrounding sleeve 126. As shown in FIG. 8, body 142 has a cylindrical hole accommodating the outer surface of sleeve 126. Body 142 has a passage 143 to connect hole 136 with a nipple 144 adapted to be connected to receiver 114. A nipple 145 has a passage 146 for carrying the fluid from hole 137 to receiver 114. Nipple 145 is threaded into an opening 147 in body 142. Suitable hoses or lines (not shown) connect nipples 144 and 145 to receiver 114.

A cylindrical control or valving piston 148 is slidably located in chamber 134. The mid-portion of piston 148 engages an annular compression seal 149 mounted on sleeve 126. Seal 149 is located in a groove in a cylindrical sleeve bearing 155. Bearing 155 rotatably mounts piston 148 on sleeve 126. Piston 148 has a head 151 facing chamber 134 and a pair of grooves 152 and 153 forming passageways for carrying the fluid from chamber 134 to the holes 136 and 137. Grooves 152 and 153, shown in FIG. 9, have a generally V-shape which decreases in cross section from head 151 to the mid-portion of piston 148. Each groove 152 and 153 has arcuate side walls which diminish in depth toward the mid-portion of piston 148. Grooves 152 and 153 can have other lengths and cross sectional shapes, including but not limited to rectangular, square, U-shaped, semi-circular, and semi-elliptical. The grooves can also have stepped shapes and extend in a spiral or circumferential fashion on piston 148.

Figure 9:
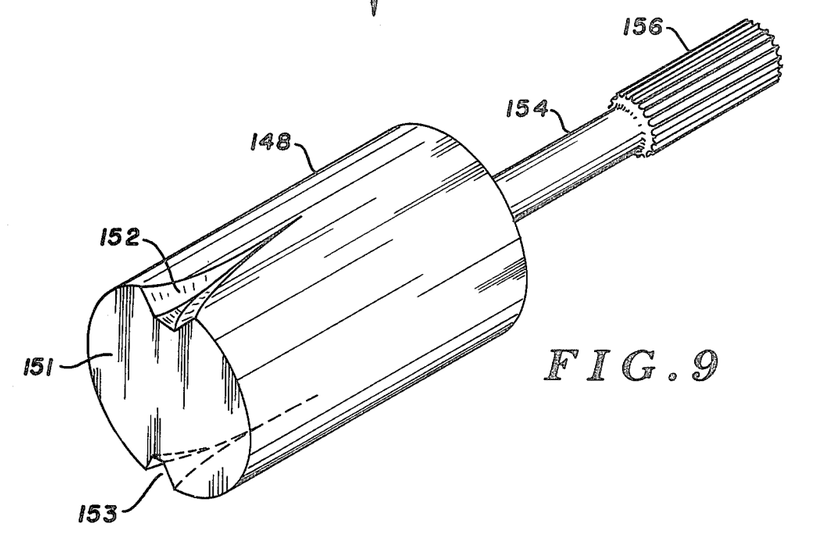
FIG. 9 is a perspective view of the control piston of the control unit of FIG. 7.

As shown in FIGS. 7 and 9, piston 148 is secured to a longitudinal cylindrical stem 154. Stem 154 extends from piston 148 along the longitudinal axis of piston 148 and terminates in a cylindrical spur gear 156. Spur gear 156 has a plurality of linear teeth which allow piston 148 to move in an axial direction into and out of chamber 134.

Returning to FIG. 7, stem 154 extends axially through a hub 57 threaded on end plate 118. Hub 157 is a cup-shaped member having a center hole 158 accommodating stem 154. The inner end of hub 157 forms a stop wall 157A that engages a portion of piston 148 to limit the out or full open position of piston 148 as shown in FIG. 7. A nut 160 threaded on hub 157 locks hub 157 in a selected position on end plate 118. Piston 148 has a central recess 159 in its right end surrounding stem 154. A compression coil spring 161 is located in the recess 159. One end of spring 161 bears against hub 157. The opposite end of spring 161 bears against a thrust bearing 165, engaging piston 148. Bearing 165 permits the piston 148 to rotate relative to spring 161. Spring 161 biases piston 148 in a forward direction, as indicated by the arrow 162. When piston 148 is in full forward direction, as shown by the broken lines, outlet openings 136 and 137 are closed. Seals 170 and 175 in sleeve 126 surround the outlet openings 136 and 137 to prevent the fluid from escaping past piston 148 through the outlet holes 136 and 137 when piston 148 is in the full closed position and when the piston grooves 152 and 153 are not aligned with the outlet holes 136 and 137.

Sleeve 126 is arcuately rotated to limit the dwell or the time that holes 136 and 137 are open to the fluid in chamber 134. A drive unit 163 is used to provide sleeve 126 with a controlled arcuate movement. Drive unit 163 comprises a reversible motor 164, such as an electric or hydraulic motor. Motor 164 drives a shaft 166 extended through a bearing 167 in end plate 117. A drive spur gear 168 connected to shaft 166 drives a large gear 169 mounted on sleeve 126. As shown in FIG. 8, sleeve 126 can be rotated in opposite directions to change the alignment of holes 136 and 137 with outlet passages 143 and 146.

Piston 148 is rotated with a piston drive mechanism indicated generally at 172. Drive mechanism 172 comprises a motor 173, such as an electric or hydraulic motor that drives a spur gear 174. Spur gear 174 is in driving relation with gear 156, thereby rotating piston 148. Gear 174 allows the gear 156 to move in a linear direction, so that the linear position of piston 148 can be controlled in response to the pressure of the fluid in chamber 134.

Referring to FIG. 8, piston 148 is rotated in the direction of an arrow 176 to intermittently align the grooves 152 and 153 with outlet holes 136 and 137. This produces an intermittent or pulsed discharge fluid from chamber 134 into outlet passages 136 and 137 and the manifold carrying fluid passages 143 and 146.

In use, pump 113 delivers fluid under pressure to chamber 134. The pressure of the fluid in chamber 134 moves piston 148 to an open position against the biasing force of spring 161. The linear distance piston 148 moves away from plate 117 and is controlled by the pressure of the fluid in chamber 134. Thus, the pressure of the fluid in chamber 134 determines the length of time or dwell that the openings 136 and 137 are aligned with grooves 152 and 153. This controls the amount of fluid that is discharged from control unit 110. Drive mechanism 172 is operated to rotate piston 148. As piston 148 rotates, the grooves 152 and 153 in the forward end of the piston sequentially are aligned with discharge openings 136 and 137. This permits the flow of fluid from chamber 136 into the manifold passages 143 and 146. The speed of rotation of piston 148 also determines the dwell of time that grooves 152 and 153 are aligned with discharge openings 136 and 137. Drive unit 163 can also be operated to angularly position sleeve 126 relative to the outlet openings or passages 143 and 146 so the manifold 138 controls or restricts the size of the discharge passages relative to openings 136 and 137, thereby limiting the discharge flow of fluid from chamber 134.

While there has been shown and described the preferred embodiments of the control unit of the invention, it is understood that the changes in the structure, materials, drives, and motors can be made by those skilled in the art without departing from the invention.

The embodiments of the invention in which an exclusive property or privilege is claimed are defined as follows:

1. A control unit operable to intermittently discharge a fluid comprising: a support, first means having a chamber mounted for rotation on the support, said first means having at least one fluid discharge opening, said support having means for allowing fluid under pressure to flow into the chamber, a piston located in the chamber and movable in said chamber from a first position to a second position, said piston having at least one groove alignable with the discharge opening when the piston is moved from the first position toward the second position, thereby allowing fluid to flow through the discharge opening, biasing means acting on the piston to move the piston to the first position, said piston being moved from the first position toward the second position by the pressure of the fluid in the chamber, and second means operable to provide relative rotation between the first means and piston, whereby the discharge opening in the first means is sequentially aligned with the groove in the piston so that the fluid is intermittently discharged through the discharge opening from the control unit.

2. The unit of claim 1 wherein: the support includes end plates, and bearing means rotatably mounting the first means on the end plates.

3. The unit of claim 1 wherein: the first means is a tubular sleeve having a chamber, said piston being slidably disposed in said chamber for axial movement between the first and second positions.

4. The unit of claim 3 wherein: said sleeve has a plurality of fluid discharge openings.

5. The unit of claim 4 wherein: said piston has a plurality of grooves alignable with said discharge openings.

6. The unit of claim 5 wherein: said grooves in said piston have a generally V-shape and diminish in depth toward the longitudinal center of the piston.

7. The unit of claim 1 wherein: said groove in the piston has a generally V-shape.

8. The unit of claim 7 wherein: said groove is open to an end and side of the piston, said groove extended toward the mid-section of the piston.

9. The unit of claim 8 wherein: said groove has a depth that decreases from the end of the piston toward the mid-section thereof.

10. The unit of claim 1 including: third means operable to angularly move the piston and hold the piston in a selected angular position.

11. The control unit of claim 10 wherein: the third means includes gear means connected to the piston and means to move the gear means, thereby rotating the piston.

12. The unit of claim 1 wherein: the biasing means is a compression spring engageable with the piston and the support.

13. The unit of claim 1 including: stop means mounted on the support and engageable with the piston to locate the piston in the second position.

14. The unit of claim 13 including: means to adjustably locate the stop means on the support, whereby the second position of the piston can be adjusted.

15. The unit of claim 1 including: a manifold mounted on the support, said manifold having a passage aligned with the groove and discharge opening for carrying the discharged fluid.

16. The unit of claim 15 wherein: the manifold has a body surrounding the first means.

17. The unit of claim 1 including: seal means mounted on the piston engageable with the first means to minimize the escape of fluid from the chamber.

18. The unit of claim 1 wherein: the second means includes drive means for rotating the first means.

19. The unit of claim 18 including: means to angularly adjust the position of the piston relative to the first means.

20. The unit of claim 1 wherein: the second means includes drive means for rotating the piston.

21. The unit of claim 20 including: means to angularly adjust the position of the first means relative to the piston.

22. The unit of claim 1 wherein: the first means is a tubular sleeve having a chamber accommodating the piston, seal means on the sleeve engageable with the piston.

23. The unit of claim 22 wherein: the sleeve has the fluid discharge opening, and said seal means including a seal surrounding the fluid discharge opening engageable with the piston.

24. A control unit operable to intermittently discharge a fluid comprising: a support, an elongated cylindrical sleeve having an internal chamber, means mounting the sleeve on the support for rotation about the longitudinal axis of the chamber, said sleeve having at least one fluid discharge opening, means for allowing fluid under pressure to flow into the chamber, a piston slidably disposed in the chamber for movement along the longitudinal axis of the chamber from a first closed position to a second open position, biasing means acting on the piston to move the piston to the first position, said piston being moved from the first position toward the second position by the pressure of the fluid in the chamber, said piston having at least one elongated groove alignable with the discharge opening in the sleeve when the piston is moved from the first position toward the second position, thereby allowing fluid to flow from the chamber through the groove and discharge opening, manifold means surrounding the sleeve, said manifold means having at least one passage for carrying fluid from the discharge opening in the sleeve to a receiver for said fluid, means for biasing the piston to the first closed position, drive means operable to provide relative rotation between the sleeve and piston, whereby the discharge opening in the sleeve in sequentially aligned with the groove in the piston so that fluid is intermittently discharged from the chamber via the groove in the piston and discharge opening into the passageway of the manifold means.

25. The unit of claim 24 wherein: the support includes end plates, and bearing means rotatably mounting the sleeve on the end plates.

26. The unit of claim 24 wherein: the sleeve has a plurality of fluid discharge openings, and the piston has a plurality of grooves alignable with said discharge openings.

27. The unit of claim 24 wherein: the piston has a forward end, and said groove has a depth that decreases from the forward end of the piston toward the mid-section thereof.

28. The unit of claim 24 including: stop means mounted on the support and engageable with the piston to locate the piston in the second position.

29. The unit of claim 28 including: means to adjustably locate the stop means on the support, whereby the second position of the piston can be adjusted.

30. The unit of claim 24 wherein: the drive means rotates the sleeve.

31. The unit of claim 30 including: means to angularly adjust the position of the piston relative to the sleeve.

32. The unit of claim 24 wherein: the drive means rotates the piston.

33. The unit of claim 32 including: means to angularly adjust the position of the sleeve relative to the piston.

34. The control unit of claim 24 wherein: the biasing means is a spring engageable with the piston.

35. The unit of claim 24 including: stop means mounted on the support and engageable with the piston to locate the piston in the second position, said biasing means being engageable with the stop means and the piston.

36. A control unit operable to discharge a fluid comprising: a support, first means having a chamber mounted on the support, said first means having at least one fluid discharge opening, said support having means for allowing fluid under pressure to flow into the chamber, piston means located in the chamber and movable along the longitudinal axis of said chamber from a first position to a second position, biasing means acting on the piston means to move the piston means to the first position, said piston means being moved from the first position to the second position by the pressure of fluid in the chamber, said piston means having groove means alignable with the discharge opening when the piston means is moved from the first position to the second position thereby allowing fluid under pressure to flow through the discharge opening, and second means operable to provide relative rotation between the first means and piston means whereby the discharge opening in the first means is periodically aligned with the groove means in the piston means so that the fluid is discharged to the discharge opening from the control unit.

37. The unit of claim 36 wherein: the first means is a tubular sleeve having a chamber, said piston means being slidably disposed in said chamber for axial movement between the first and second positions, said sleeve having a plurality of discharge openings, said piston means having a plurality of groove means alignable with said discharge openings.

38. The unit of claim 36 wherein: said groove means in said piston means have a generally V shape and diminution depth toward the longitudinal center of the piston means.

39. The unit of claim 36 including: stop means mounted on the support and engageable with the piston means to locate the piston means in a second position.

40. The unit of claim 36 wherein: the second means includes drive means for rotating the first means.

41. The unit of claim 36 including: means to angularly adjust the position of the piston means relative to the first means.

42. The unit of claim 36 wherein: the second means includes drive means for rotating the piston means.

43. The unit of claim 36 including: means to angularly adjust the position of the first means relative to the piston means.

* * * * *

UNITED STATES PATENT AND TRADEMARK OFFICE
CERTIFICATE OF CORRECTION

PATENT NO. : 4,192,348
DATED : March 11, 1980
INVENTOR(S) : Craig N. Hansen

It is certified that error appears in the above-identified patent and that said Letters Patent are hereby corrected as shown below:

Column 6, line 27, "an" should be --the--.

Column 6, line 48, "of" should be --or--.

Column 8, line 41, "in" (second occurrence) should be --is--.

Signed and Sealed this

Seventeenth Day of June 1980

[SEAL]

Attest:

SIDNEY A. DIAMOND

Attesting Officer    Commissioner of Patents and Trademarks